UNITED STATES PATENT OFFICE.

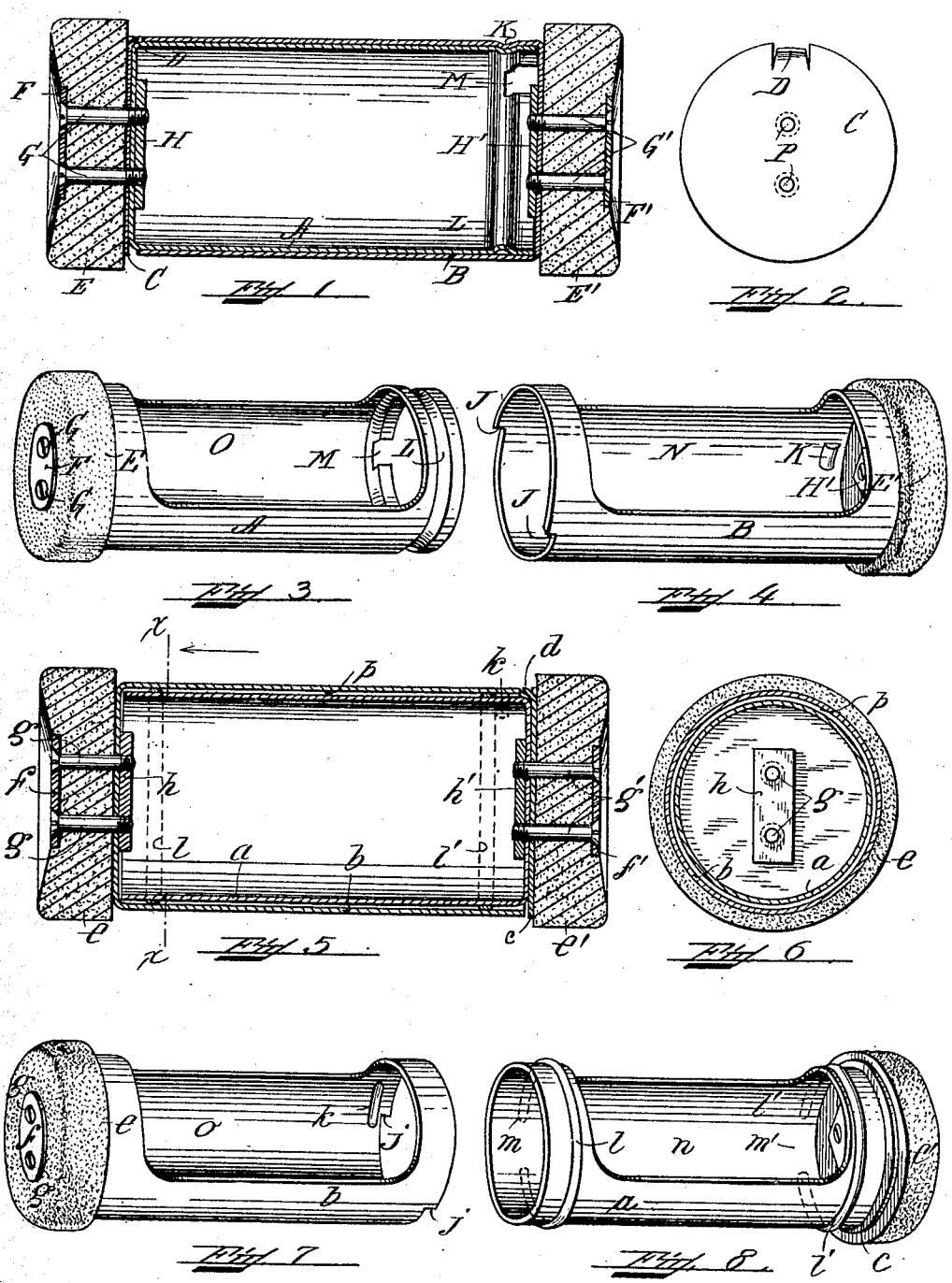

ISAAC W. LITCHFIELD, OF BOSTON, MASSACHUSETTS, ASSIGNOR TO LAMSON CONSOLIDATED STORE SERVICE COMPANY, OF NEWARK, NEW JERSEY, A CORPORATION OF NEW JERSEY.

CARRIER FOR PNEUMATIC-DESPATCH-TUBE APPARATUS.

No. 871,423.　　　　Specification of Letters Patent.　　　　Patented Nov. 19, 1907.

Application filed January 29, 1906. Serial No. 298,306.

*To all whom it may concern:*

Be it known that I, ISAAC W. LITCHFIELD, of Boston, in the county of Suffolk and State of Massachusetts, have invented certain new and useful Improvements in Carriers for Pneumatic - Despatch - Tube Apparatus, of which the following is a specification.

My invention relates to improvements in carriers for pneumatic despatch tube apparatus its object being to produce a carrier of simple construction, the shells of which may be separable without removing the buffers or felts.

Another feature is the maintaining of an even clearance between the telescoping surfaces of the inner and outer shells preventing binding in case of indentation of the outer shell.

In the following drawings which illustrate two forms of construction embodying my invention,—Figure 1 is a longitudinal sectional view of one form. Fig. 2 is a detail of plate carrying projection. Fig. 3 is a perspective view of inner shell. Fig. 4 is a perspective view of outer shell. Fig. 5 is a longitudinal section of a modification of the carrier. Fig. 6 is a cross section on line $x$—$x$, Fig. 5, looking in direction indicated by arrow. Fig. 7 is a perspective view of outer shell of modification. Fig. 8 is a perspective view of inner shell of modification.

Like letters of reference refer to like parts throughout the several views.

The plate C carrying the projection D is mounted between the felt E and the closed end of the inner shell A and held in position by screws G mounted in holes P and screwed into threaded plate or nut H on the inside of said shell A. Washer F supports the head of the screws preventing them from tearing through the felt. Buffer E' is attached to the closed end of outer shell B by screws G' fastened into threaded nut H'.

Part of the open end of the outer shell B is cut away forming stops J—J, which, when the shells are telescoped in operating position limit the rotation of the inner shell A by engaging the stop or projection D. The projection K located near the open end of the outer shell B, on the inner side thereof, is adapted to coöperate with the recess or circumferential groove L near the open end of the inner shell A (see Fig. 1) thereby preventing the longitudinal separation of the shells while the rotation is limited by the projection D engaging the stops J. Sufficient rotation of the shells is permitted by the stops to allow the coöperation or closing of the openings.

If it is desired to separate the shells, the screws G are loosened sufficiently to allow the projection D on the plate C to slide past the stops J until the projection K registers with opening M when the shells may be separated.

In the modification shown in Fig. 5, the plate $c$ is held between the buffer C' and the closed end of the inner shell $a$ by screws $g'$ set in nut $h'$. The outer shell $b$ carries the buffer $c$ attached to the closed end thereof by screws $g$ set in nut $h$. The stops $j$—$j$ located at the open end of the shell $b$ are adapted to limit the rotation of the shells by engaging the projection $d$ on plate $c$. This rotative movement is sufficient to allow the coöperation and closing of the openings $o$ and $n$ in shells $b$ and $a$ respectively. The circumferential strips $l$ and $l'$ located on the outer periphery of the inner shell $a$, one near each end, are adapted to maintain an even space between said inner shell $a$ and the outer shell $b$, thereby preventing binding in case of indentation of the outer shell. The internal projection $k$ on the outer shell $b$ is adapted to engage with the strip $l'$ preventing longitudinal separation of the shells during the limited rotation thereof. If desired to separate said shells the screws $g'$ are loosened sufficiently to allow the projection $d$ to pass stops $j$—$j$ upon rotation until the internal projection $k$ registers with openings $m$ and $m'$ in circumferential strips $l$ and $l'$, when the shells may be readily separated.

Having thus described my invention and set forth a construction embodying the same, what I claim as new and desire to secure by Letters Patent of the United States is:—

1. In a carrier for pneumatic despatch tube apparatus, two cylindrical telescoping members, said members rotatable one within the other, each having a corresponding peripheral opening therein, said openings coöperative upon rotation of said members, and means for maintaining a clearance between the curved surfaces of the inner and outer telescoping members.

2. In a carrier for pneumatic despatch tube apparatus, two cylindrical telescoping members, the outer end of each member being closed and carrying a buffer attached thereto, said members rotatable one within the other, each having a corresponding peripheral opening therein, said openings coöperative upon rotation of said members, a plate carrying a projection and rigidly mounted between the closed end of the inner member and the buffer attached thereto, and stops on the open end of the outer member adapted to engage said projection thereby limiting the rotation of the members to the opening and closing of the openings therein.

3. In a carrier for pneumatic despatch tube apparatus, two cylindrical telescoping members, the outer end of each member being closed and carrying a buffer attached thereto, said members rotatable one within the other, each having a corresponding peripheral opening therein, said openings coöperative upon rotation of said members, a plate carrying a projection and rigidly mounted between the closed end of the inner member and the buffer attached thereto, stops on the open end of the outer member adapted to engage said projection thereby limiting the rotation of the members to the opening and closing of the openings therein, a circular recess or groove in one member, and a projection or guide in the other member adapted to coöperate with said recess thereby normally preventing separation of the members.

4. In a carrier for pneumatic despatch tube apparatus, two cylindrical telescoping members, the outer end of each member being closed and carrying a buffer attached thereto, said members rotatable one within the other, each having a corresponding peripheral opening therein, said openings coöperative upon rotation of said members, a plate carrying a projection and rigidly mounted between the closed end of the inner member and the buffer attached thereto, stops on the open end of the outer member adapted to engage said projection thereby limiting the rotation of the members to the opening and closing of the openings therein, a circular recess or groove in one member, a projection or guide in the other member adapted to coöperate with said recess thereby normally preventing separation of the members, and means for separating said members upon disengagement of said projection with said stops.

In testimony whereof, I have signed my name to this specification in the presence of two subscribing witnesses, this seventeenth day of January, A. D. 1906.

ISAAC W. LITCHFIELD.

Witnesses:
A. S. TEMPLE,
E. ZEMMIN.